United States Patent
McConnell, Sr.

(10) Patent No.: US 6,622,966 B1
(45) Date of Patent: Sep. 23, 2003

(54) SYSTEM FOR EXTINGUISHING WILD FIRES AND METHOD THEREFOR

(76) Inventor: John R. McConnell, Sr., 8202 E. Indian School Rd., Scottsdale, AZ (US) 85251

( * ) Notice: Subject to any disclaimer, the term of this patent is extended or adjusted under 35 U.S.C. 154(b) by 0 days.

(21) Appl. No.: 10/253,002

(22) Filed: Sep. 23, 2002

(51) Int. Cl.$^7$ .................................................. B64D 1/00
(52) U.S. Cl. .......................... 244/136; 239/171; 169/53
(58) Field of Search ..................... 244/136; 239/171; 169/53

(56) References Cited

U.S. PATENT DOCUMENTS

| | | | |
|---|---|---|---|
| 3,933,309 A | * | 1/1976 | Odegaard .................... 239/171 |
| 3,936,018 A | * | 2/1976 | Barlow ........................ 244/136 |
| 4,090,567 A | | 5/1978 | Tomlinson .................... 169/53 |
| 4,175,701 A | * | 11/1979 | Wojciehowski et al. ...... 239/11 |
| 4,195,693 A | * | 4/1980 | Busch et al. ................. 169/53 |
| 4,278,221 A | * | 7/1981 | Wilson ........................ 244/136 |
| 4,437,630 A | | 3/1984 | Jefferies ...................... 244/136 |
| 4,629,148 A | | 12/1986 | Perinet ........................ 244/136 |
| 5,137,233 A | * | 8/1992 | Maimon et al. ............. 244/136 |
| 5,320,282 A | | 6/1994 | Ramerth ...................... 239/171 |
| 5,326,053 A | | 7/1994 | Pahl et al. ................... 244/136 |
| 5,899,276 A | | 5/1999 | Relyea et al. ................. 169/25 |
| 6,244,520 B1 | | 6/2001 | Patchett ...................... 239/114 |
| 6,367,712 B1 | | 4/2002 | Larsen ........................ 239/159 |

* cited by examiner

Primary Examiner—J. Woodrow Eldred
(74) Attorney, Agent, or Firm—Jeffrey D. Moy; Harry M. Weiss; Weiss, Moy & Harris, P.C.

(57) ABSTRACT

A system for dispensing a liquid from an aircraft to extinguish a fire has a container located in a body of the aircraft for storing the liquid to extinguish the fire. A boom is coupled to an exterior section of the body of the aircraft and to the container. The boom has a hollow interior section and a plurality of openings formed on a bottom section of the boom. The openings are used for dispensing the liquid from the container. A pump is coupled to the container and the boom for dispensing the liquid from the container and out through the boom. A rotating mechanism is coupled to the boom for rotating the boom.

8 Claims, 2 Drawing Sheets

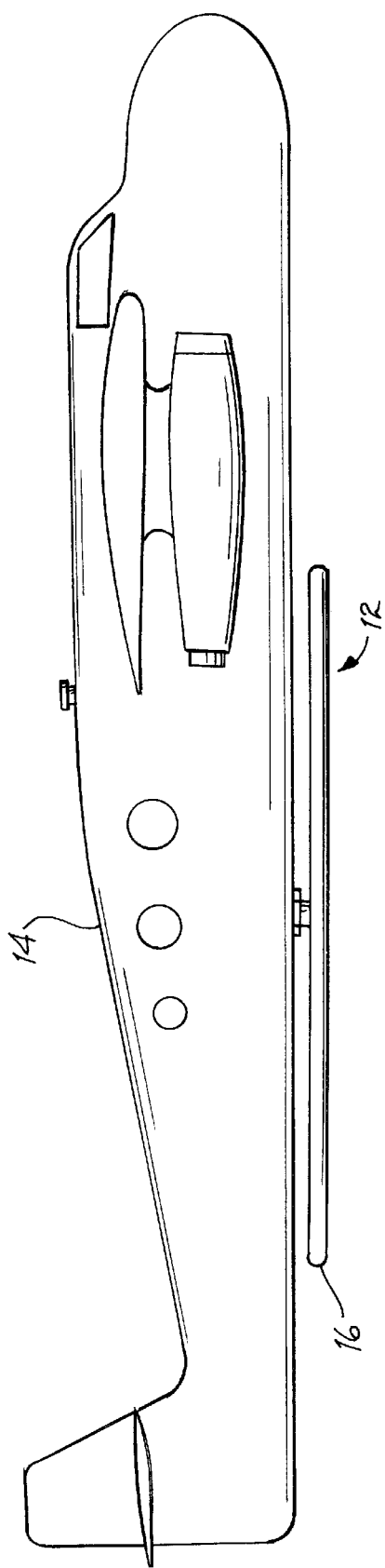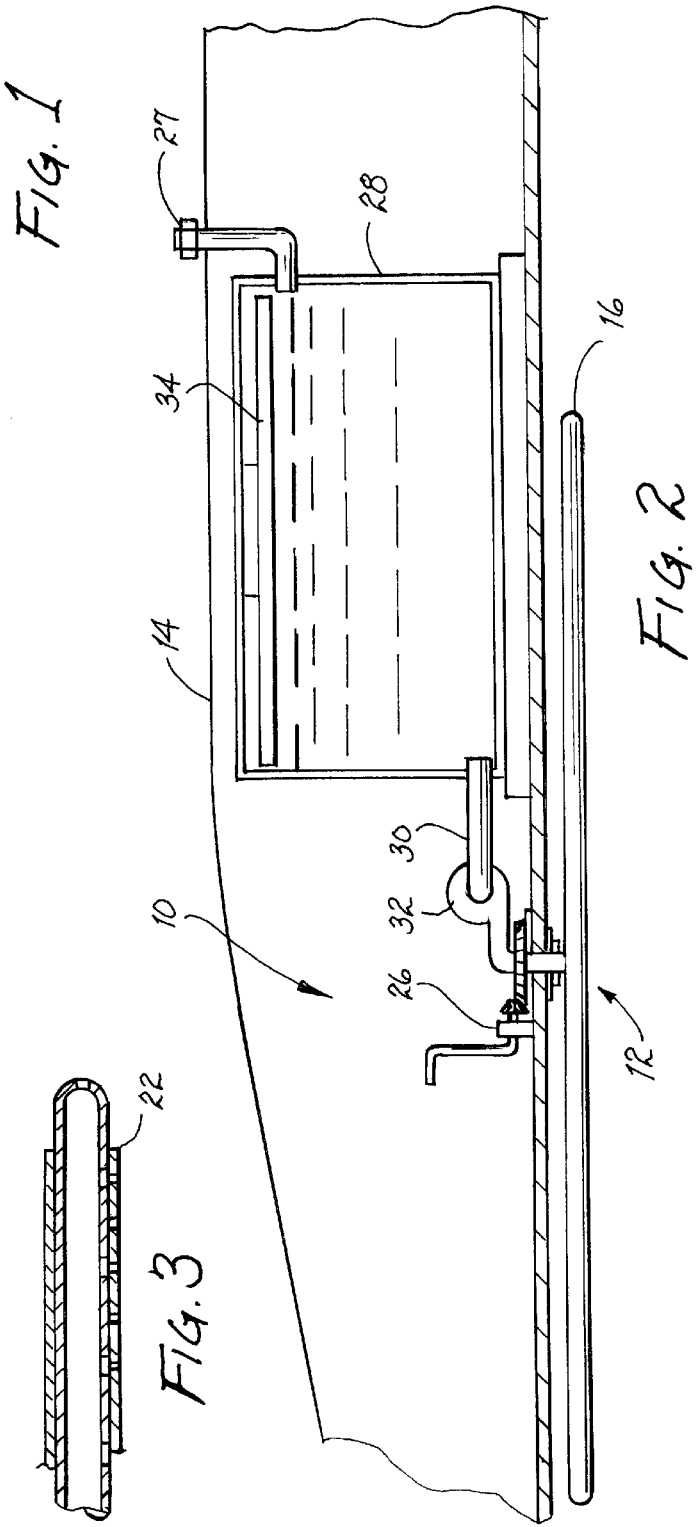

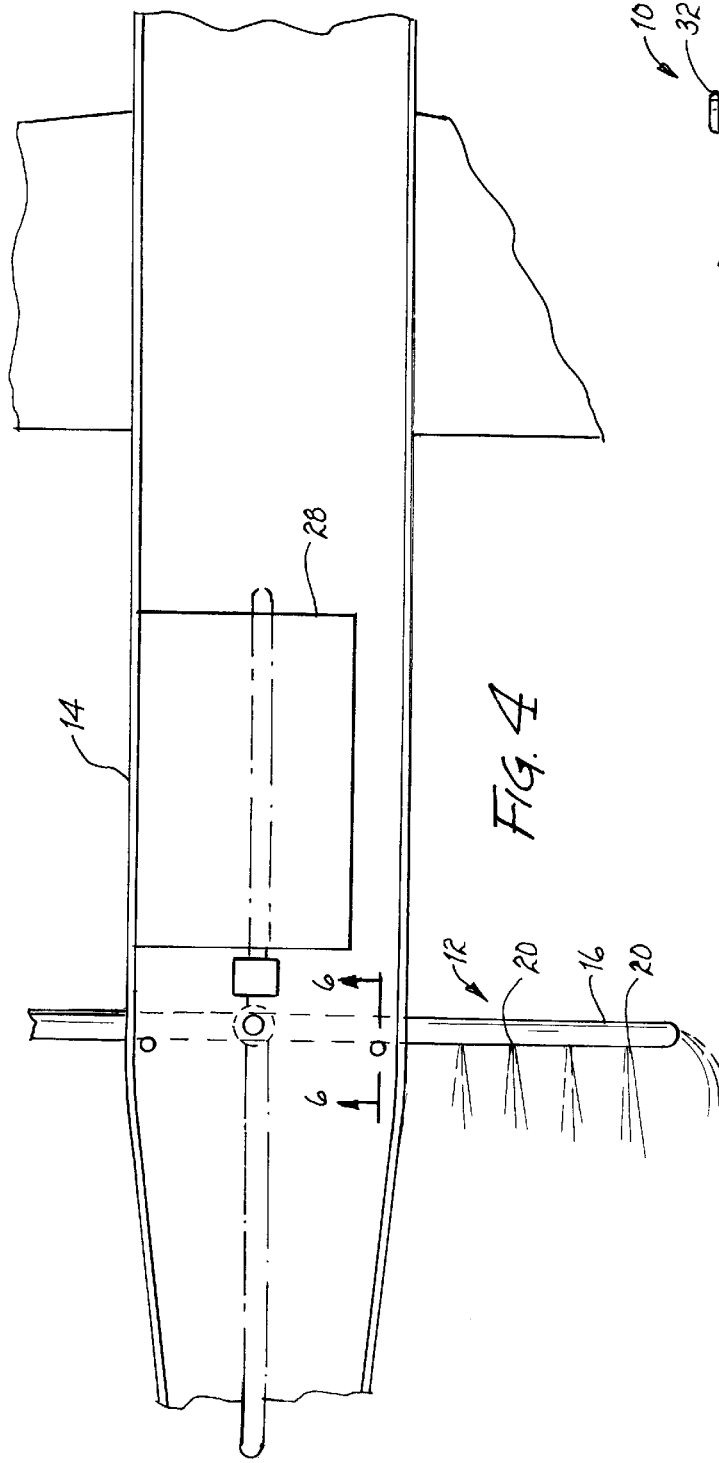
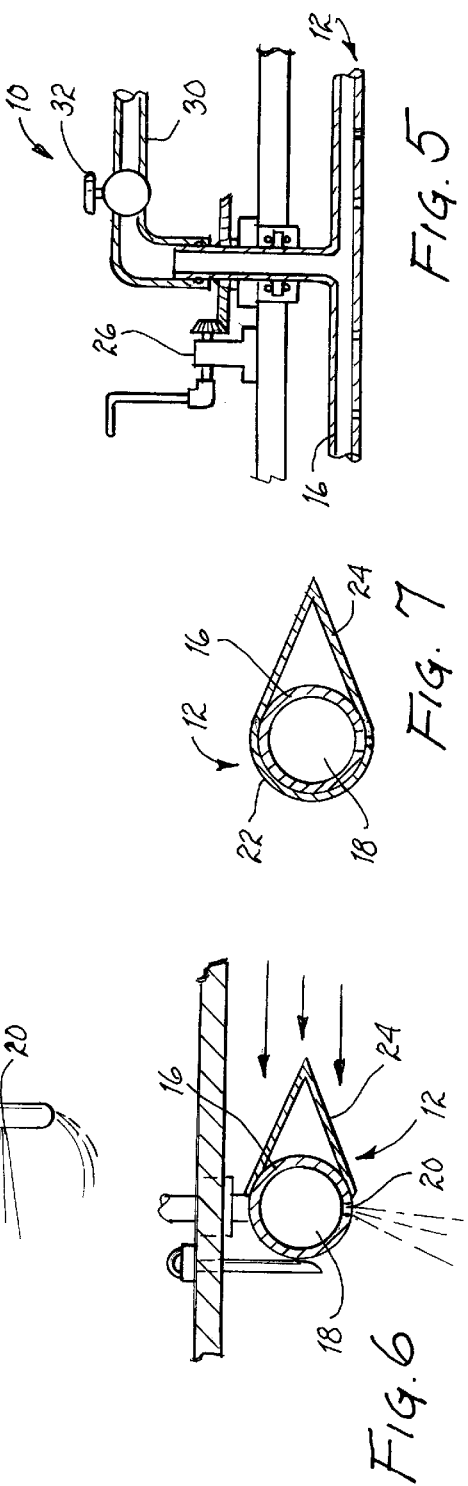

SYSTEM FOR EXTINGUISHING WILD FIRES AND METHOD THEREFOR

BACKGROUND OF THE INVENTION

1. Field of the Invention

This invention relates generally to fire extinguishing equipment and, more specifically, to a system and method for controlling and extinguishing wild fires by applying a controlled flow of a liquid, similar to a rain storm, over the area.

2. Description of the Prior Art

When fighting wild fires, quickly reaching the area and attacking the fire greatly improves the chances of restricting the fire and reducing damage to both property and life. Unfortunately, many wild fires are in areas where it is difficult for humans to reach. Because of this problem, aircraft has been used to fight wild fires.

In general, some type of liquid delivery system is used in the aircraft for fire fighting. When fighting a wild fire, the aircraft will make a single pass over the area and the liquid delivery system will drop all of the liquid during that single pass. In general, the aircraft will open the delivery doors and drop all of the liquid on a specified target area. Most liquid delivery systems do not allow one to control how the liquid is delivered.

When fighting fires, it is best to drop the liquid in a controlled and predetermined ground pattern to ensure the best possible coverage to extinguish the fire. Different drop patterns are desirable for different types of fires. In general, it may not be best to drop all the liquid at once in a single location as most liquid delivery systems do.

Therefore, a need existed to provide an improved system and method for ariel delivery of a liquid to fight a wild fire. The improved system and method for ariel delivery of a liquid will allow one to provide a constant flow of liquid over an extended area in order to fight a wild fire. The improved system and method for ariel delivery of a liquid will allow one to provide a constant flow of liquid over an extended area in order to fight a wild fire and control the amount of liquid dispersed.

SUMMARY OF THE INVENTION

In accordance with one embodiment of the present invention, it is an object of the present invention to provide an improved system and method for ariel delivery of a liquid to fight a wild fire.

It is another object of the present invention to provide an improved system and method for ariel delivery of a liquid which will allow one to provide a constant flow of liquid over an extended area in order to fight a wild fire.

It is still another object of the present invention to provide an improved system and method for ariel delivery of a liquid which will allow one to provide a constant flow of liquid over an extended area in order to fight a wild fire and control the amount of liquid dispersed.

BRIEF DESCRIPTION OF THE EMBODIMENTS

In accordance with one embodiment of the present invention, a system for dispensing a liquid from an aircraft to extinguish a fire is disclosed. The system has a container for storing the liquid to extinguish the fire. A boom is coupled to the container. The boom has a hollow interior section and a plurality of openings formed on a bottom section of the boom for dispensing the liquid from the container.

In accordance with another embodiment of the present invention, a system for dispensing a liquid from an aircraft to extinguish a fire is disclosed. The system comprises a container located in a body of the aircraft for storing the liquid to extinguish the fire. A boom is coupled to an exterior section of the body of the aircraft and to the container. The boom has a hollow interior section and a plurality of openings formed on a bottom section of the boom. The openings are used for dispensing the liquid from the container. A pump is coupled to the container and the boom for dispensing the liquid from the container and out through the boom. A rotating mechanism is coupled to the boom for rotating the boom.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

FIG. 1 is a side view of an airplane equipped with the system for extinguishing wild fires of the present invention.

FIG. 2 is a side view of the system for extinguishing wild fires of the present invention.

FIG. 3 is a cross-sectional view of a section of the water dispensing boom used in the system for extinguishing wild fires of the present invention.

FIG. 4 is a bottom view of the airplane equipped with the system for extinguishing wild fires of the present invention showing the rotating of the water dispensing boom.

FIG. 5 is a close-up view of the water pumping system used in the system for extinguishing wild fires of the present invention.

FIG. 6 is a cross-sectional side view of the water dispensing boom used in the system for extinguishing wild fires of the present invention.

FIG. 7 is another cross-sectional side view of the water dispensing boom used in the system for extinguishing wild fires of the present invention.

DETAILED DESCRIPTION OF THE PREFERRED EMBODIMENT

Referring to the Figures, wherein like numerals and symbols represent like elements, a system 10 for extinguishing wild fires is shown. The system 10 will provide for the ariel delivery of a liquid in order to fight a wild fire. The system 10 will allow one to provide a constant flow of liquid over an extended area in order to fight the wild fire and further control the amount of liquid dispersed.

The system 10 has a liquid dispensing boom 12. The liquid dispensing boom 12 is able to rotate as seen more clearly in FIG. 4. The liquid dispensing boom 12 can be rotated so that the liquid dispensing boom 12 is horizontal to the body of the aircraft 14 during takeoff and landing and perpendicular to the body of the aircraft 14 when in use. It should be noted that the water dispensing boom 12 may be rotated to any position between these two levels if desired.

The liquid dispensing boom 12 is comprised of a tubular member 16. The tubular member 16 will have a hollow interior section 18. At the bottom of the tubular member 16 will be a plurality of openings 20. The openings 20 will run the entire length of the tubular member 16. In operation, a liquid will flow through the hollow interior section 18 of the tubular member 16 and out of the plurality of openings 20.

As may be seen more clearly in FIGS. 3, 6, and 7, a cover 22 is rotatably coupled to the outer section of the tubular member 16. The cover 22 will allow one to control the size of the plurality of openings 20. By rotating the cover 22, one may adjust the size of each of the plurality of openings 20.

Further coupled to the outer section of the tubular member 16 is a wing member 24. The wing member 24 is used to make the tubular member 16 more aerodynamic. When the tubular member 16 is perpendicular to the body of the aircraft, the wing member 24 will deflect air around the tubular member 16 as shown in FIG. 6. This will relieve pressure on the tubular member 16 when the tubular member 16 is use.

Coupled to the tubular member 16 is a rotating device 26. The rotating device 26 is used to move the position of the tubular member 16. As stated above, the liquid dispensing boom 12 can be rotated so that the liquid dispensing boom 12 is horizontal to the body of the aircraft 14 during takeoff and landing and perpendicular to the body of the aircraft 14 when in use. The rotating device 26 will allow for the rotation of the liquid dispensing boom 12. The rotating device 26 may be a hand operated crank, a motor driven rotating device, or the like. It should be noted that the listing of the above mentioned rotating devices 26 should not be seen as to limit the scope of the present invention.

The liquid dispensing boom 12 is coupled to a liquid holding container 28. The liquid holding container 28 is used to hold the liquid prior to the liquid being dispensed by the liquid dispensing boom 12. The liquid holding container 28 may be made of any type of material. For example, metal, acrylic, fiberglass, or the like may be used. It should be noted that the listing of the above materials should not be seen as to limit the scope of the present invention.

In the embodiment depicted in the Figures, a fill port 27 is coupled to a top section of the liquid holding container 28.

The fill port 27 will allow one to refill the liquid holding container 28 when the liquid holding container 28 is empty or only partially filled.

A tubing 30 is used to couple the liquid holding container 28 to the liquid dispensing boom 12. A pump 32 is coupled between the tubing 30 and the liquid dispensing boom 12. The pump 32 is used to transfer the liquid from the liquid holding container 28 to the liquid dispensing boom 12. The pump 32 will provide additional pressure in order to discharge the liquid through the liquid dispensing boom. 12 at a faster rate. In general, a small horsepower pump is all that is required.

It should be noted that the pump 32 may not be required. The liquid dispensing boom 12 may be directly coupled to a bottom section of the liquid holding container 28. The cover 22 will prevent the liquid from being dispensed from the liquid dispensing boom 12. When the liquid needs to be dispensed, the cover 22 will rotate thereby opening the plurality of openings 20. Alternatively, a valve may be coupled between the liquid holding container 28 to the liquid dispensing boom 12. One may open and close the valve to release the liquid.

Located within the liquid holding container 28 is a weighted float 34. The weighted float 34 is used to keep an equal pressure within the liquid holding container 28 and to prevent "sloshing" of the liquid. Many times when an aircraft banks to turn, the liquid in the container will move around. The liquid may move or "slosh" around in such a manner that it may be difficult for the liquid to be dispensed from the liquid holding container 28 to the liquid dispensing boom 12. In fact, if the aircraft makes, a sharp bank, the liquid may move around in the liquid holding container 28 such that no liquid is dispensed. The weighted float 34 will ensure that the liquid stored in the liquid holding container 28 will remain level. As the liquid is dispensed, the weighted float 34 will automatically lower to ensure that the liquid stored in the liquid holding container 28 will remain level.

Operation

In operation, the liquid holding container 28 is filled with a fire extinguishing liquid through the fill port 27. Once the liquid holding container 28 is full, the aircraft is ready for take off. Prior to taking off, one must ensure that the liquid dispensing boom 12 is parallel to the body of the aircraft. If not, one must rotate the liquid dispensing boom 12 via the rotating device 26 to a parallel position. Once the aircraft is airborne, the aircraft will fly towards the wild fire.

Once in position, the liquid dispensing boom 12 is again rotated so that the liquid dispensing boom 12 is perpendicular to the body of the aircraft. The cover 22 is rotated to expose the plurality of openings 20. The aircraft will then fly over the wild fire as the liquid is discharged from the liquid holding container 28 through the liquid dispensing boom 12. It should be noted that multiple aircraft may be used. In this situation, the aircraft will fly in a formation over the wild fire as the liquid is dispensed from the liquid dispensing boom 12.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for dispensing a liquid from an aircraft to extinguish a fire comprising, in combination:
    a container for storing the liquid to extinguish the fire;
    a weighted float located within the container for keeping the liquid in the container level; and
    a boom coupled to the container wherein the boom has a hollow interior section and a plurality of openings formed on a bottom section of the boom for dispensing the liquid from the container.

2. A system for dispensing a liquid from an aircraft to extinguish a fire in accordance with claim 1 further comprising a pump coupled to the container and the boom for dispensing the liquid from the container and out through the boom.

3. A system for dispensing a liquid from an aircraft to extinguish a fire in accordance with claim 1 further comprising a rotating mechanism coupled to the boom for rotating the boom.

4. A system for dispensing a liquid from an aircraft to extinguish a fire in accordance with claim 1 wherein the boom further comprises a covering coupled to the boom for controlling the size of the plurality of openings.

5. A system for dispensing a liquid from an aircraft to extinguish a fire in accordance with claim 1 further comprising an aerodynamic wing coupled to the boom for deflecting air around the boom.

6. A system for dispensing a liquid from an aircraft to extinguish a fire comprising, in combination:

a container located in a body of the aircraft for storing the liquid to extinguish the fire;

a weighted float located within the container for keeping the liquid in the container level;

a boom coupled to an exterior section of the body of the aircraft and to the container wherein the boom has a hollow interior section and a plurality of openings formed on a bottom section of the boom for dispensing the liquid from the container;

a pump coupled to the container and the boom for dispensing the liquid from the container and out through the boom;

a rotating mechanism coupled to the boom for rotating the boom.

7. A system for dispensing a liquid from an aircraft to extinguish a fire in accordance with claim 6 wherein the boom further comprises a covering coupled to the boom for controlling the size of the plurality of openings.

8. A system for dispensing a liquid from an aircraft to extinguish a fire in accordance with claim 6 further comprising an aerodynamic wing coupled to the boom for deflecting air around the boom.

* * * * *